(12) United States Patent
Beller et al.

(10) Patent No.: US 6,655,374 B1
(45) Date of Patent: Dec. 2, 2003

(54) PORTABLE STACKING GAS GRILL

(75) Inventors: Ross Beller, Woodlands, TX (US); Mario M. Gonzalez, Hampshire, IL (US); John Hauptman, Schaumburg, IL (US)

(73) Assignee: Grillco, Inc., Aurora, IL (US)

( * ) Notice: Subject to any disclaimer, the term of this patent is extended or adjusted under 35 U.S.C. 154(b) by 0 days.

(21) Appl. No.: 09/666,098

(22) Filed: Sep. 21, 2000
(Under 37 CFR 1.47)

Related U.S. Application Data
(60) Provisional application No. 60/155,947, filed on Sep. 24, 1999.

(51) Int. Cl.[7] .............................. A47J 37/00; F24C 3/00
(52) U.S. Cl. ................. 126/41 R; 126/39 E; 126/39 K; 126/305; 431/286
(58) Field of Search ................................ 126/41 R, 9 R, 126/39 R, 25 R, 304 A, 304 R, 38, 39 E, 40, 39 N, 50, 214 R; 248/222.52, 224.8, 250; 431/278, 286; 99/447, 449

(56) References Cited

U.S. PATENT DOCUMENTS

| | | | | |
|---|---|---|---|---|
| 2,225,176 A | * | 12/1940 | Lewis et al. | 126/41 R |
| 2,845,056 A | * | 7/1958 | Chambers | 126/214 R |
| 3,809,051 A | * | 5/1974 | Giroux | 126/9 R |
| 4,899,724 A | * | 2/1990 | Kuechler | 126/41 R |
| 5,368,009 A | * | 11/1994 | Jones | 126/41 R |
| 5,605,142 A | * | 2/1997 | Parker | 126/304 R |
| 5,761,990 A | * | 6/1998 | Stewart et al. | 126/41 R |
| 5,819,719 A | * | 10/1998 | Vidal | 126/41 R |
| 6,102,029 A | * | 8/2000 | Stephen et al. | 126/41 R |

* cited by examiner

Primary Examiner—James C. Yeung
(74) Attorney, Agent, or Firm—Barnes & Thornburg

(57) ABSTRACT

The invention is directed to a portable stacking gas grill that can be stacked for ease of transportation and storage. The grill includes a firebox, a at least one cooking grate, a plurality of burners, at least one radiant guard unit, at least one pilot light system, a shelf and a pair of folding legs. The grill is designed so that it can be tilted onto its side to allow the legs to be folded into a recess beneath the firebox without the cook top, burners and radiant guard unit moving out of position. The pilot light system includes a pilot runner tube that allows individual burners to be turned on and off with out the need for an outside ignition source. The firebox is designed so that several grills can be stacked so that the space needed for storage and transportation is greatly reduced.

2 Claims, 6 Drawing Sheets

PORTABLE STACKING GAS GRILL

RELATED APPLICATION

This patent application claims priority from application Ser. No. 60/155,947 filed on Sep. 24, 1999.

BACKGROUND OF THE INVENTION

The present invention relates to grills, more particularly to portable commercial outdoor cooking grills with a large cooking surface. Grills of the commercial type are typically large, bulky devices used for events in which large quantities of food need to be prepared at one time.

The grills typically have a firebox containing a plurality of gas burners where each burner is independently controlled by a manually operated gas control valve. Typically a multiple piece radiant guard is placed directly above the burner to reduce flare-ups and protect the burners from debris. The radiant guards that protect the burners in the prior art, are burdensome to remove for cleaning and fall out of place when the grill is transported or tilted on its side.

Typically, gas is supplied to the burners from a portable gas source such as a liquid propane (LP) tank. Gas is directed from the LP tank through the gas control valves to the burners. The prior art typically does not provide a source of ignition to light the gas exiting the burners which forces the operator of the grill to use another means for ignition such as matches or an elongated butane lighter. At best, some of the prior art uses a spark type ignition which allows the operator to press a spark ignitor while simultaneously turning on the burner gas valve. These spark ignitions are sensitive to moisture and are an unreliable means of igniting the gas in situations where burners are constantly being turned on and shut off. Igniting the burners becomes burdensome and dangerous in the prior art if the burners are constantly being turned on and off since gas may accumulate in the firebox increasing the chance of a flare-up or an explosion when the burner is relit.

The firebox is typically mounted on a cart with wheels or pipe legs so they can be transported from one location to another. However, the overall shape of these commercial grills renders them awkward for transportation and makes storage difficult since an abundant amount of floor space is required to allow placement of the grilling units side by side. These transportation and storage restrictions limit the amount of commercial grills available at one time if adequate storage and transportation are not available.

DESCRIPTION OF THE INVENTION

The present invention is particularly directed to a portable gas grill which can be stacked for easy transportation and storage. The grill in the present invention has a firebox which incorporates a pair of foldable legs that support the unit when the grill is in use. When the grill is not in use or is transported, the legs can be folded into a recessed area under the firebox. When the legs are folded, the overall grill height is greatly reduced thereby allowing the units to be stacked upon one another for easy storage and transportation. A lip on the firebox allows the units to be stacked and prevents movement. A benefit derived from the ability to stack the grill units is the large amount of space saved when transporting or storing.

The invention incorporates a single piece radiant guard section to cover a plurality of burners in the firebox. By using a one piece radiant guard section, the installation and removal becomes a one step operation greatly reducing the difficulty and amount of time required to remove and install the guard for cleaning purposes. The radiant guards as well as all other components of the grill are secured to the firebox which allows the operator to tip the grill on its side for transportation without all of the components moving out of place.

To reduce the risk of flare-ups or the possibility of an explosion, the present invention incorporates a pilot light system to allow an operator to start a burner without using a supplemental lighting source such as matches or a spark type ignition that needs to be used each time a burner is turned on. An ignitor initially lights the pilot light that maintains a pilot runner tube from which each burner individually lights. Using a pilot light system not only provides additional protection to the operator from potential explosions from unlit gases, but adds convenience by allowing the operator to repeatedly turn the burners on and off.

DETAILED DESCRIPTION OF THE INVENTION

Figure 1:
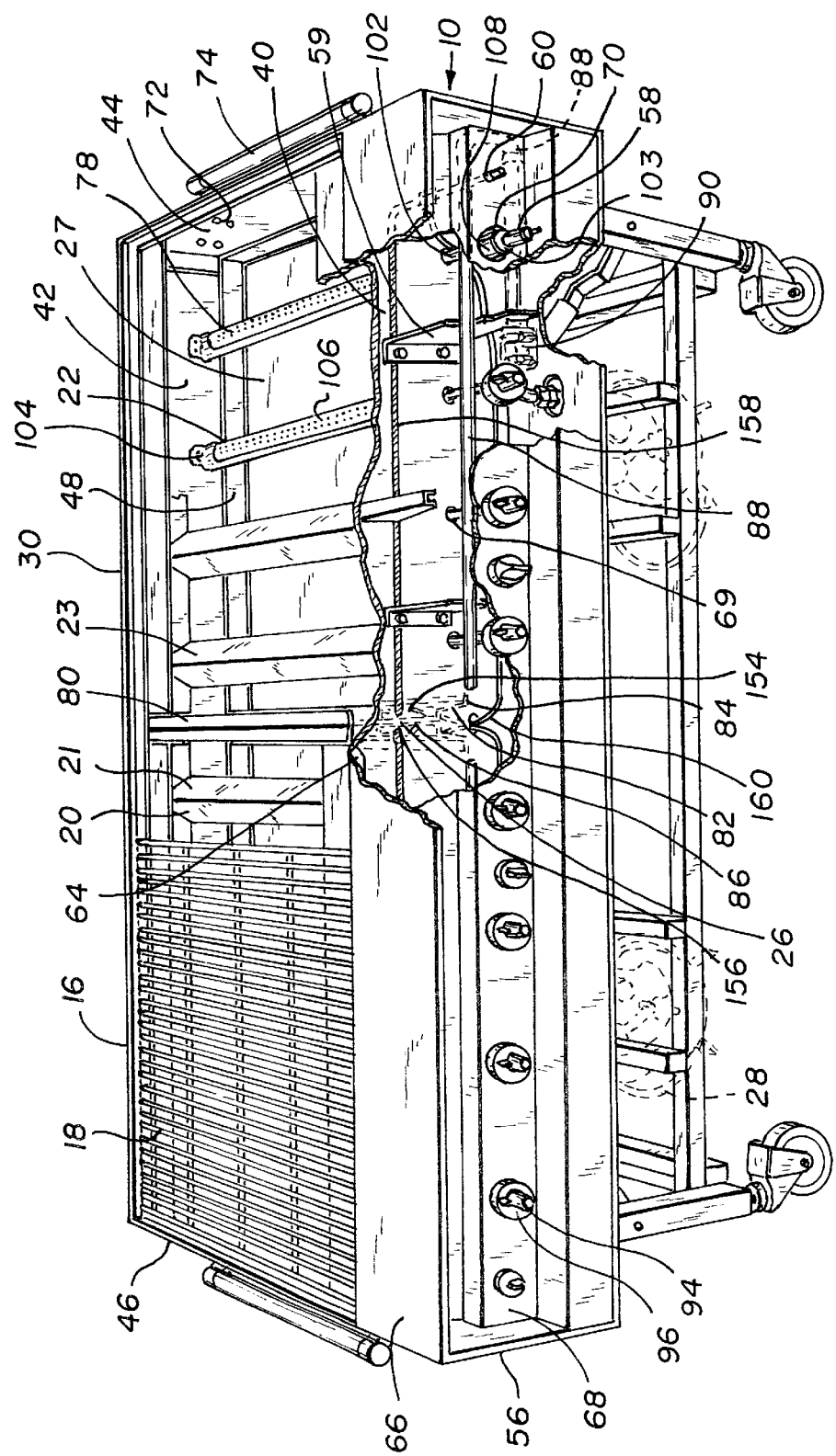
FIG. 1 is a perspective view of a portable stacking gas grill according to the present invention having portions of the firebox and radiant guard unit cut away, thus exposing the flame system.

For the purpose of promoting an understanding of the principles of the invention, references will be made to the embodiment illustrated in the drawings. Specific language will also be used to describe the same. It will, nevertheless, be understood that no limitation of the scope of the invention is thereby intended, such alterations and further modifications in the illustrated device, and such further applications of the principles of the invention illustrated herein being contemplated as would normally occur to one skilled in the art to which the invention relates.

A preferred embodiment of a portable stacking gas grill 10 of the present invention is shown in FIG. 1 with folding legs 12 extended and a shelf 14 attached. The portable stacking gas grill 10 is adapted to be folded so that it can be stacked for storage and transportation.

The portable stacking gas grill 10 includes a firebox 16 that is comprised of a cooking surface 18, a face plate 56, a radiant guard unit 20, a flame unit 22, burner control valves 58, a pilot light system 26, drip pans 27, a pair of folding legs 12 and a support shelf 14 for supporting gas tanks 28.

Figure 2:
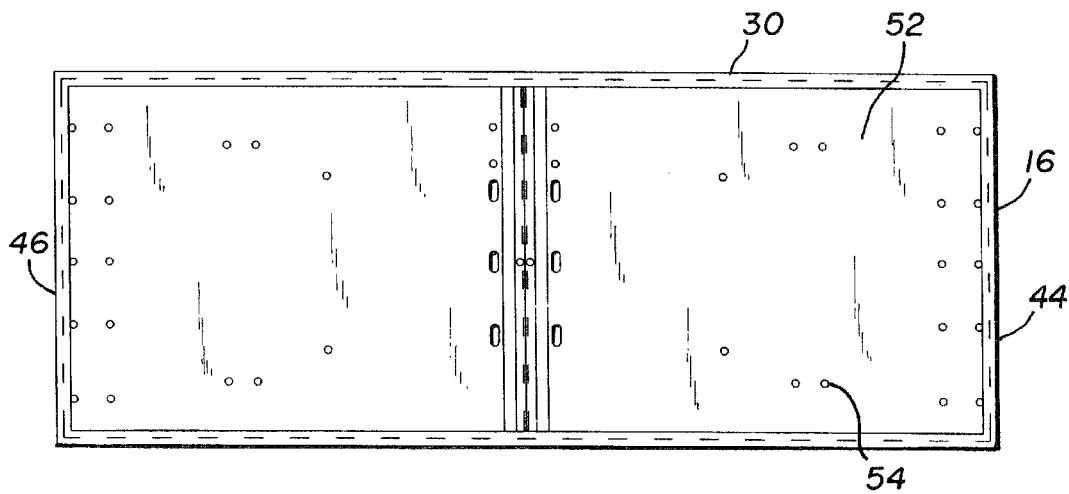
FIG. 2 is a top view of the firebox.
Figure 3:
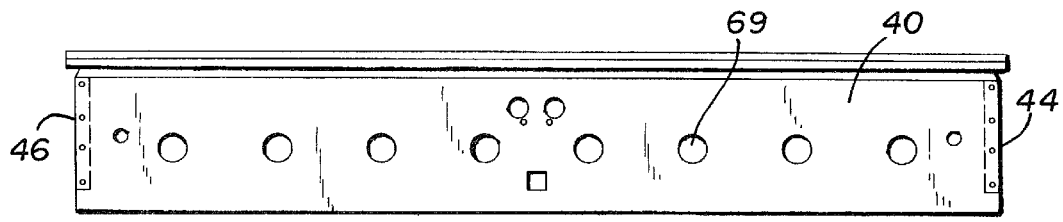
FIG. 3 is a front elevational view of the firebox.
Figure 4:
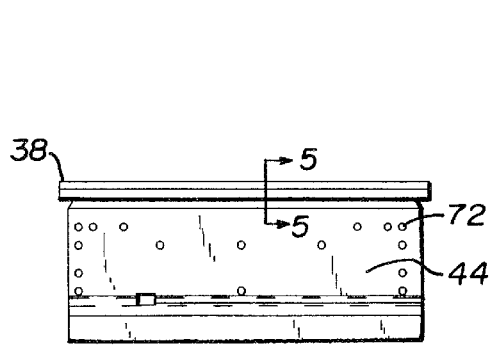
FIG. 4 is a side elevational view of the firebox.
Figure 5:
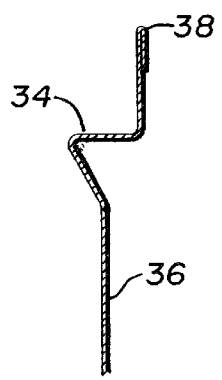
FIG. 5 is a cross-sectional view of the firebox according to FIG. 4 showing the lip used to support the cooking surface.
Figure 9:
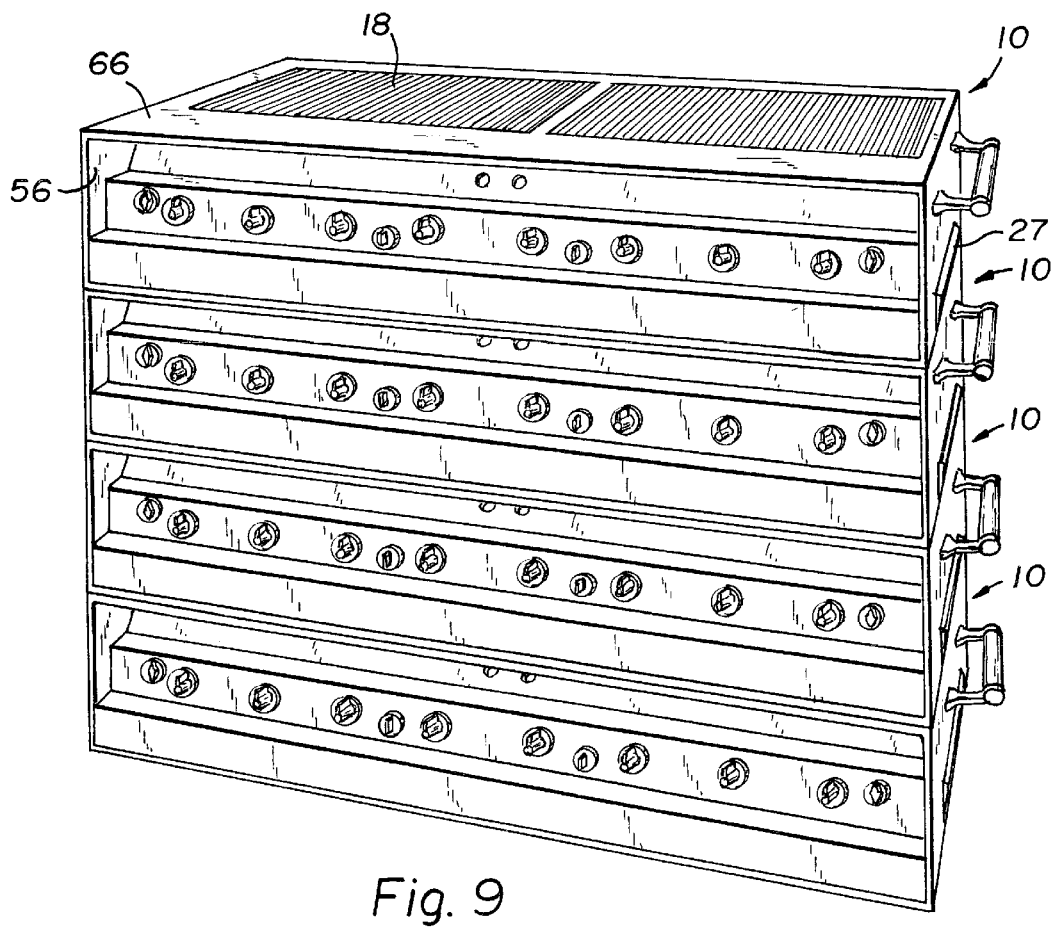
FIG. 9 is a perspective view of four portable stacking gas grills stacked for storage or transportation.
Figure 14:
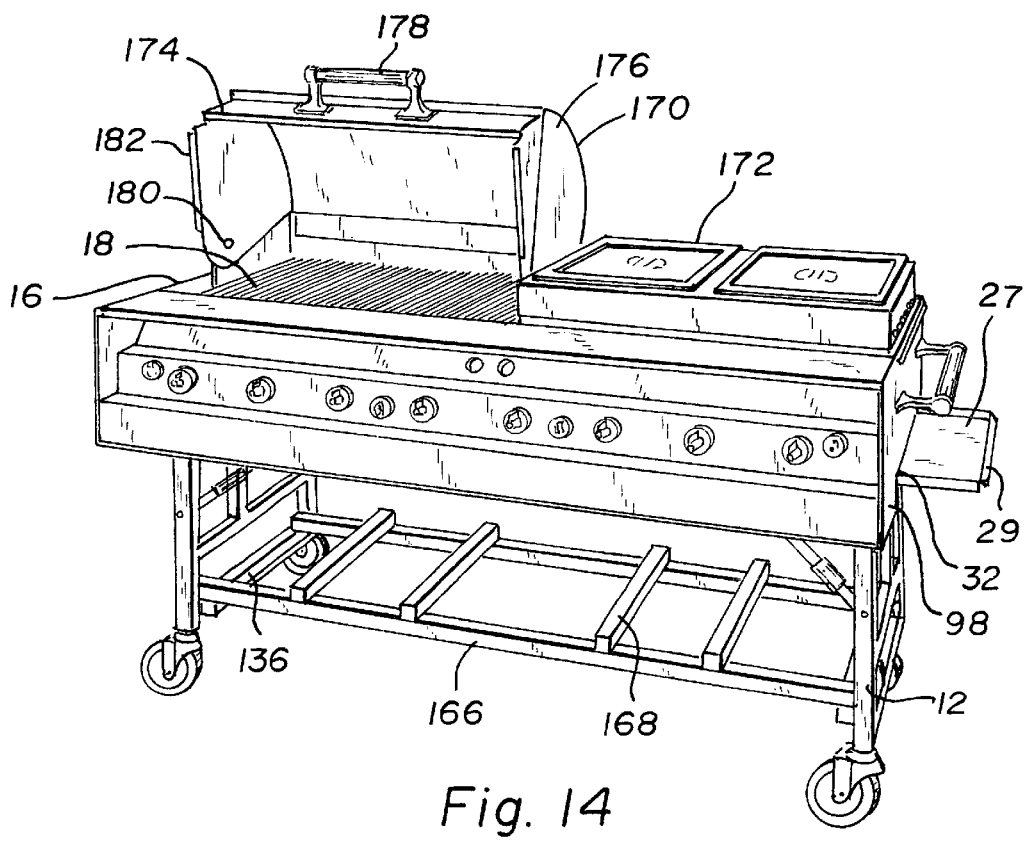
FIG. 14 is a perspective view of the grill with an optional hood and steam trays.

The firebox 16, shown best in FIGS. 1–5, is tray-shaped and is typically formed from sheet metal. In the preferred embodiment, the firebox 16 is made from stainless steel. The firebox 16 includes a top side 30 and a bottom side 32. The firebox 16 further includes a front surface 40, a spaced apart rear surface 42, a right side 44 and a spaced apart left side 46. The top side 30 includes a horizontal lip 34 that extends around the perimeter of the firebox 16. The lip 34, best shown in FIG. 5, is integral to the firebox 16 in that it is formed by a protrusion in the sheet metal 36. In the illustrative embodiment shown, the lip 34 is formed by bending the sheet metal 36 of the firebox 16 inward at a 90 degree angle. The metal 36 is then bent back 135 degrees outward and 45 degrees downward. A top edge 38 is formed by bending the sheet metal 36 outward and downward 180 degrees which provides for a smooth edge. The lip 34 is designed to support the cooking surface 18 and is also designed to support other grills 10 during transportation or storage, as shown in FIG. 9. A bottom surface 52 of the firebox 16, shown in FIG. 2, is used to support the drip pans 27. The sheet metal 36 on the right 44 and left 46 sides of the firebox 16 do not extend as low as the front 40 and rear 42 surfaces, thereby creating an opening to slide the drip pans 27 onto the bottom surface 52. The bottom surface 52 of the firebox 16 contains a plurality of apertures 54 to allow for the connection of the folding legs 12 to the bottom side 32 of the firebox 16. The front surface 40 contains a plurality of apertures 69, shown in FIG. 1, to allow for the attachment of a grill faceplate 56, and the passage of burner control valves 58 and pilot control valves 60. The right 44 and left 46 sides of the firebox 16 includes apertures 72 to allow for the fastening of the faceplate 56 and handles 74 to the firebox 16 to allow for easy handling during transporting. The rear surface (not shown) also contains a plurality of apertures (not shown) to allow for the attachment of burners 78 and the radiant guard unit 20. The top side 30 of the firebox 16 includes an I-beam shaped central support member 80 which divides the firebox 16 into right and left side cooking sections. A vertical member 86 of the central support member 80 acts as a backstop when the drip pans 27 are inserted. The drip pans 27 are inserted through the side of the firebox 16, as shown in FIG. 14, and are designed to catch grease drippings from the food being cooked on the cooking surface 18. The drip pans 27 are shallow trays constructed out of stainless sheet steel and include a handle 29 on the outward edge to facilitate removal during cleaning. Water can be added to the pans 27 to help keep food moist, reduce smoke, flare-ups and make cleanup easier.

The faceplate 56 is rectangular in shape and extends outwardly from the front surface 40. The faceplate 56 includes a ridge 64 that attaches to the top edge of the firebox 16 and is further attached to the right 44 and left 46 sides by mean of bolt fasteners. The faceplate 56 is fastened to the front surface 40 of the firebox 16 and extends outwardly to conceal a gas line 88, fittings 90, burner control valves 58, pilot control valves 60 and mounting brackets 59. The faceplate 56 is made from sheet metal, preferably stainless steel. A front surface 68 of the faceplate 56 contains apertures 70 to allow for the fastening of the burner 58 and pilot 60 control valves. To conceal the connection between the valves 58 and 60 and the apertures 70, knobs 94 are installed with a flared backing plate 96. The backing plate 96 is printed with the various burner settings. A lower edge 98 of the faceplate 56, as shown in FIG. 14, extends below the bottom side 32 of the firebox 16 which creates a recess to allow for the legs 12 to be retracted beneath when the grill 10 is stored or transported. A stainless steel top surface 66, best shown in FIG. 1, of the faceplate 56 is generally planar and acts as a table work surface designed to allow placement of cooking utensils, plates and the like to aid in the ingress and egress of food from the cooking surface 18. The surface 66 has a smooth finish to facilitate easy cleanup in the event that food is spilled.

The flame unit 22 of the illustrated embodiment, shown in FIG. 1, is comprised of eight burners 78 spaced apart every six inches to provide even heating across the cooking surface 18. The preferred material to construct the burners is stainless steel but other metals may be used. Burners 78 of the firebox 16 are tubular in shape and include a first end 102 and a second end 104. The first end 102 includes an end cap 103 that encloses the end of the burners 100. Each end cap 103 includes a threaded aperture (not shown) so the burners 100 can be attached to the burner control valves 58. The burner control valves 58 are interconnected with a central gas line 88 that is connected to a gas source. The first end 102 further includes air shutters 108 which are openings in the walls of the burners 100 to allow air to enter the gas stream to provide oxygen to produce a blue flame. To prevent debris and insects from entering the air shutters 108, debris guards (not shown) are installed on the inside of the burners 100. The burners 100 further include a plurality of gas outlet apertures 106 to allow for the release of gas.

The pilot light system 26, as shown in FIG. 1, is comprised of an igniter 154, a pilot light assembly 156, pilot control valves 60 and a pilot runner tube 158. Each pilot control valve 60 is attached to and receives gas from the gas line 88. The gas is diverted after the pilot control valves 60 to the pilot light assembly 156 and to the pilot runner tube 158. The pilot light assembly 156 is attached to the central support member 80 and receives gas from a small gas tube 160. The igniter 154 is integrated into the pilot light assembly 156. When the gas valve 60 is rotated to the on position, gas travels through the pilot runner tube 158 and through the gas tube 160 to the pilot light assembly 156. Soon after the gas begins to flow through the pilot assembly, the igniter 154 ignites the gas, which ignites the pilot light assembly 156. The pilot light assembly 156 maintains ignition of the pilot runner tube 158. The pilot runner tube 158 is positioned perpendicularly over the burners 78 to allow for automatic ignition when the burners are turned on, eliminating the need for matches or lighter wands.

Figure 6:
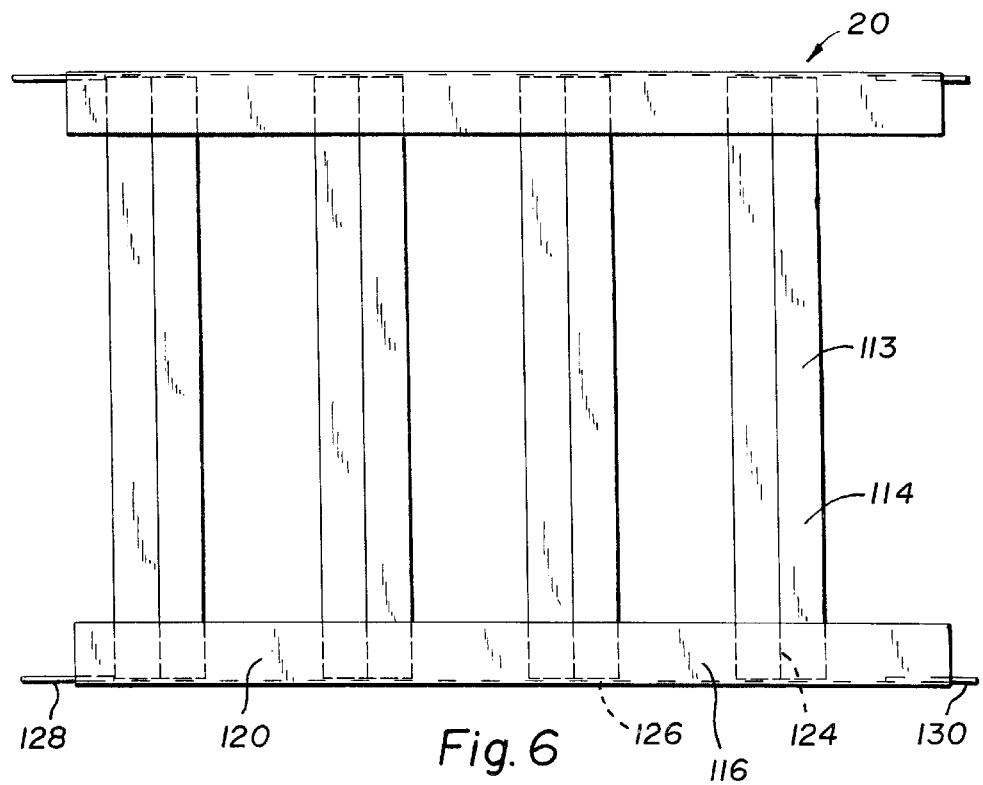
FIG. 6 is a top view of the radiant guard unit.
Figure 7:
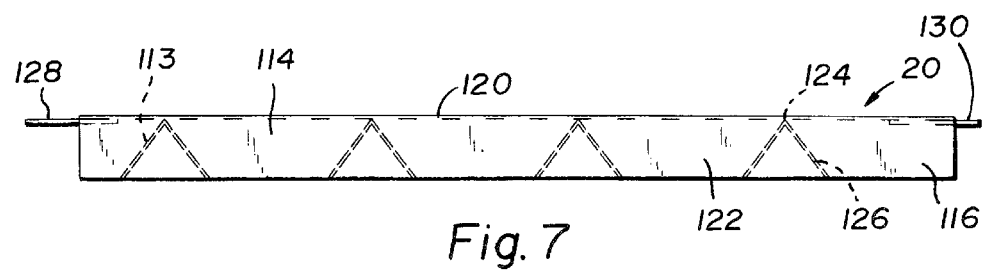
FIG. 7 is a front elevational view of the radiant guard unit.
Figure 8:
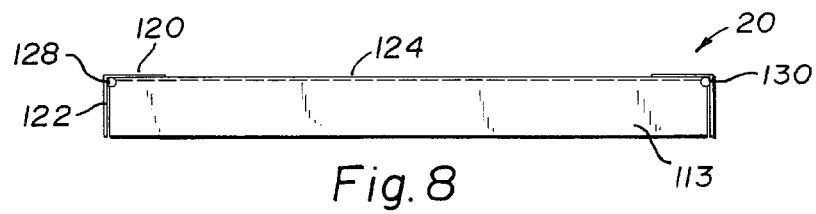
FIG. 8 is a side elevational view of the radiant guard unit.

To prevent flame flare-up from food grease dripping through the cooking surface and to aid in heat distribution, the burners 78 are covered by the radiant guard unit 20, which includes a left and right unit 21 and 23. The radiant guard unit 20, shown in FIGS. 6–8, has a unitized construction and is preferably made out of stainless steel but can be constructed out of other metals as well. The radiant guard 20 includes six angle irons 114. The first four angle irons 114 form burner covers 113 and are arranged parallel configuration and have a spacing equal to the spacing between the burners 78. The burner covers 113 are positioned so that they form an apex 124 when installed onto the side members 116. The remaining two angle irons 114 form the side members 116 which interconnect the burner covers 113. The side members 116 are oriented so that a first side 120 is positioned at the apex 124 of burner covers 113 and a second side 122 is positioned so that it is in contact with ends 126 of the burner covers 113. The burner covers 113 can be attached to the side members by spot welding. The side members 116 further include inward and outward attachment pins 128 and 130 that connect with the central support member 80 and the right 44 or left 46 side of the firebox 16, depending on which radiant guard 20 is being installed. The preferred attachment of the pins 128 and 130 to the side members 116 is by tack welding. The radiant guard 20 can be removed from the grill 10 without the need for tools because the pins 128 and 130 slide through the apertures 72 and 81 of the central support member 80 and the right 44 or left 46 side of the firebox 16. The side members 116 are sized so that their length is less than the length of one half of the firebox 16. The inward pin 128 is longer than the outward pin 130 The angled structure of the radiant guard 20 diverts grease and sauces that have dripped off of the cooking surface 18 away from the burners 78 and into the drip pans 27. Grease and sauce that does not drip off of the hot radiant guard 20 is burnt, creating smoke to enhance the flavor of the food. The radiant guard units 20 are designed to remain in place when the grill 10 is tilted onto its rear surface 42 to allow the legs 12 to be folded.

Figure 10:
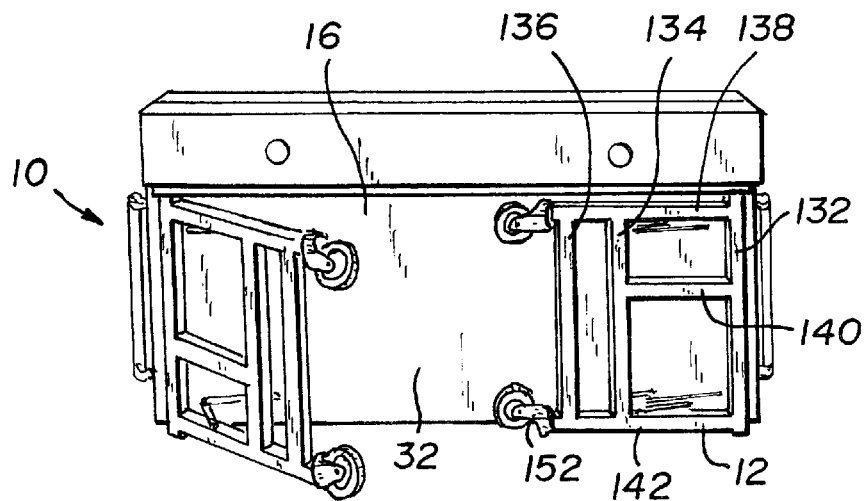
FIG. 10 is a perspective view of the bottom of the stacking gas grill with the legs partially folded.
Figure 11:
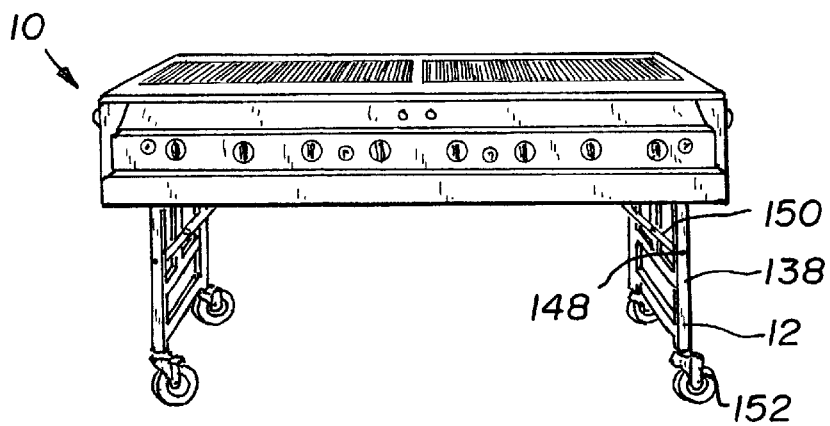
FIG. 11 is a perspective view of the front of the stacking gas grill with the legs fully extended and locked into place.
Figure 12:
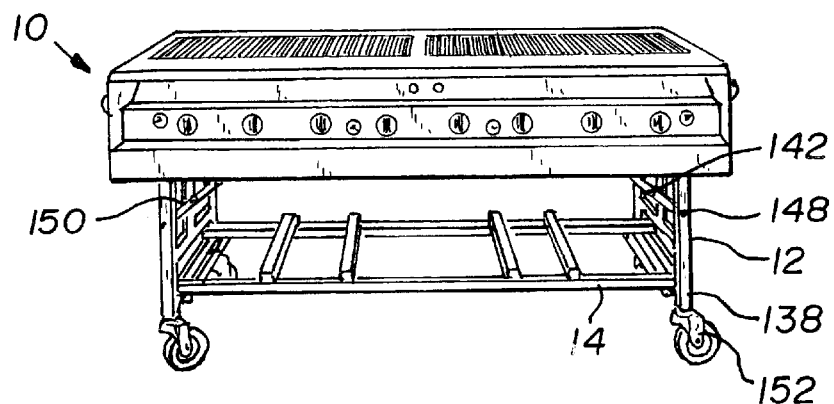
FIG. 12 is a perspective view of the front of the stacking gas grill with the legs extended and the shelf attached.
Figure 13:
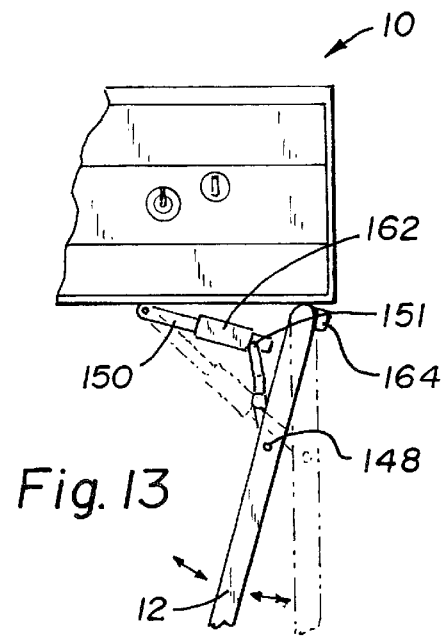
FIG. 13 is a front elevational view of the stacking gas grill with the leg partially folded and the leg lock in the unlocked position.

The legs 12 of the grill 10, shown in FIGS. 10–12 are constructed out of square tubing, which is preferably aluminum but can be made out of other materials as well. FIGS. 10–12 also illustrate how the grill 10 is set up by unfolding the legs 12 and putting the shelf 14 in place. To protect the aluminum and provide for an aesthetic finish, the tubing is coated with a powder-coat paint. The legs 12 include three horizontal members 132–136, shown best in FIG. 10, and three vertical members 138–142. The three horizontal members 132–136 are affixed to the vertical members 138–142 to add structural rigidity to the grill 10 when the legs 12 are in use. The upper horizontal member 132 is pivotally connected to the bottom side 32 of the firebox 16. The lower horizontal member 136, when the legs 12 are extended, is used to support the shelf 14, as shown in FIG. 12. The outboard vertical members 138 and 142 include apertures 148 to allow for the pivotal attachment of the leg locks 150 that lock the legs in the open position. The legs 12 further include casters 152 pivotally attached at the lower end for ease of transportation. The leg locks 150, best shown in FIG. 13, include a center hinge 151 and are pivotally connected to the bottom side 32 of the firebox 16 and to the vertical members 138 and 142 of the legs 12. The leg locks 150 also include a locking collar 162 that slides over the center hinge 151 to prevent the legs 12 from closing. To fold the legs 12 under the firebox 16 the collar 162 is slid upward, exposing the hinge 151 allowing the legs 12 to be folded inward. When folded, a secondary support structure in the form of pads 164 on the legs provides stable support when stacked upon other grill units 12.

The shelf 14, shown in FIG. 14, is constructed out of square aluminum tubing but can be made from tubing of other geometrical shapes and materials. The aluminum tubing is finished in a powder coat paint to protect the shelf 14 from the elements. The shelf 14 is designed to stabilize the legs 12 while providing an area to hold the LP gas tanks 28. The shelf 14 includes two tubular members 166 that run lengthwise under the grill 10 and rest on the horizontal member 136 of the legs 12. Also included are tank support members 168 for supporting the LP gas tanks 28 to prevent movement.

To increase the utility of the grill 10, an optional roll-top hood 170 and trays 172 can be placed upon the top of the firebox 16. Both the roll-top hood 170 and the trays 172 are constructed out of stainless sheet steel but can be manufactured from other materials as well. The roll-top hood 170 is comprised of a front section 174 and a rear section 176. The front section includes a handle 178 and pivots into the rear section 176 by use of two pivots 180. The lower edges 182 are flared outward to provide for a stable footing when placed upon the top of the firebox 16. When the front section 174 is rolled into the rear section 176, the cooking surface 18 is exposed so food to be added or removed from the grill 10. When the front section 174 is moved to the closed position, heat is trapped under the hood 170 simulating an oven. The trays 172 are placed upon the cooking surface 18 and can be enclosed by the roll-top hood 170. The trays can be used to keep food warm or for cooking certain foods, such as vegetables, that would normally fall through the cooking surface 18.

Various features of the invention have been particularly shown and described in connection with the illustrated embodiment of the invention, however, it must be understood that these particular arrangements merely illustrate, and that the invention is to be given its fullest interpretation within the terms of the appended claims.

What is claimed is:

1. A stackable portable cooking unit for cooking and warming food comprising: a firebox, wherein said firebox includes a top surface having a cooking surface adapted to stackably support at least one other like portable cooking unit; said firebox further including a set of burners and a pilot runner tube that can be operated independently of said burners; a support structure adapted to allow said stackable portable cooking unit to be stacked upon at least one other like portable cooking unit; said firebox includes a face plate; said face plate extends beneath said firebox to create a recess; and said recess adapted to allow the retraction of said support structure;

said support structure includes a secondary support structure; and wherein said secondary support structure is exposed when said support structure is retracted into said recess and said secondary support structure adapted to support said stackable portable cooking unit when placed upon at least one other portable cooking unit.

2. A stackable portable cooking unit for cooking and warming food comprising:

a firebox, wherein said firebox includes a top surface adapted to stackably support at least one other like portable cooking unit; and a lip extending around the perimeter of said firebox; said firebox further including a face plate that extends beneath said firebox to create a recess;

a support structure adapted to support said firebox when in an open position and adapted to fit in said recess when in a retracted position, said support structure including a plurality of secondary support members;

wherein said secondary support members are exposed when said support structure is retracted beneath said firebox; and said secondary support members are adapted to support said stackable portable cooking unit when placed upon at least one other portable cooking unit.

* * * * *